K. C. COX.
SELENIUM CELL ESPECIALLY ADAPTED FOR USE IN CONNECTION WITH TELEGRAPHY.
APPLICATION FILED JUNE 2, 1915.
1,156,524.
Patented Oct. 12, 1915.
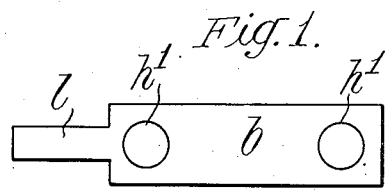
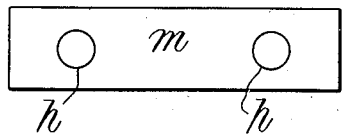
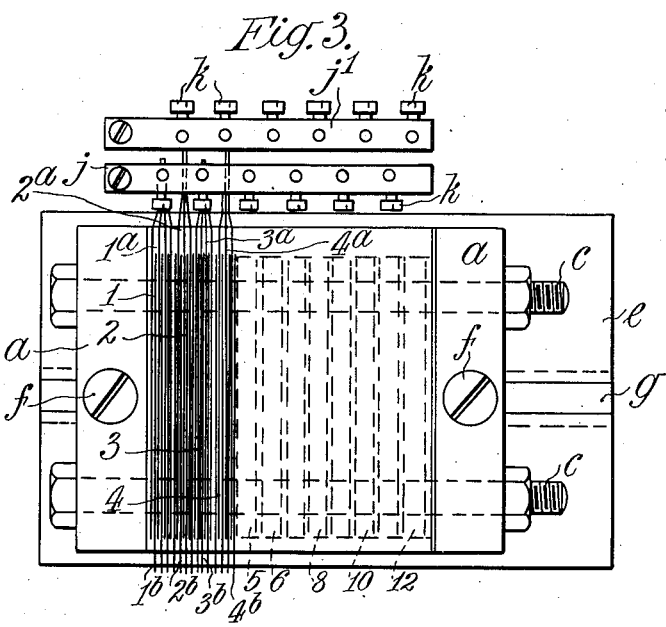
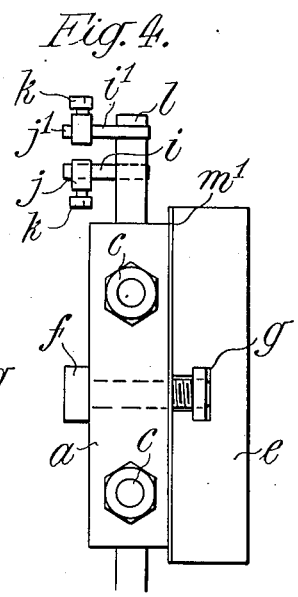
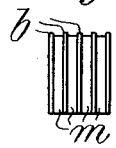
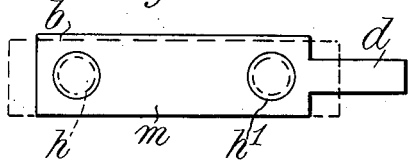
Witnesses
Jas. K. McCathran
David R. Wagner
Kenwrick C. Cox, Inventor.
By E. G. Siggers
Atty.

UNITED STATES PATENT OFFICE.

KENWRICK C. COX, OF NORFOLK ISLAND.

SELENIUM CELL ESPECIALLY ADAPTED FOR USE IN CONNECTION WITH TELEGRAPHY.

1,156,524. Specification of Letters Patent. Patented Oct. 12, 1915.

Application filed June 2, 1915. Serial No. 31,787.

*To all whom it may concern:*

Be it known that I, KENWRICK CECIL COX, a subject of His Majesty the King of England, residing at Norfolk Island, South Pacific, electrician, have invented certain new and useful Improvements in Selenium Cells Especially Adapted for Use in Connection with Telegraphy, of which the following is a specification.

This invention relates to improvements in selenium "cells" especially adapted for use in connection with telegraphy.

The object of the invention is to so arrange the selenium in a selenium "cell" as to obtain a "cell" having a comparatively low electrical resistance and considerable current carrying capacity, combined with a high degree of sensitiveness to changes in the illumination of its surface and small "inertia" effect.

The invention is hereinafter described in detail with reference to the accompanying drawings in which:—

Figure 1 is a detail view of one of the brass plates; Fig. 2 is a detail view of one of the mica plates; Fig. 3 is a front view of the improved "cell"; Fig. 4 is an end view thereof; and Figs. 5 and 6 are detail views illustrating the relationship of the brass and mica plates when assembled.

As shown, in the preferred manner of carrying out this invention, a number of thin perforated plates $b$ of brass as shown in Fig. 1 and mica as shown in Fig. 2, are tightly clamped between two brass blocks $a$ by means of the bolts $c$ passing therethrough. The brass and mica plates $b$ and $m$ are arranged alternately as indicated in Figs. 3 and 4 in which the groups of lines represent the edges of the brass plates and the spaces between the lines the mica plates, and the brass plates are provided with lugs which are arranged so that they project alternately from opposite sides of the complete "cell." The lugs on the one side are joined all together, or in groups as may be required and those on the other side are similarly joined together, or in groups as required, or as shown. The lugs on the two sides of the cell form the terminals of the cell.

The mica plates $m$ are slightly narrower than the brass and when clamped together the edges of the brass project slightly above the mica as shown in Figs. 4 and 5.

In practice the brass plates $b$ are conveniently made from brass tape about .003 inch (3 mils) thick such as is used in the construction of submarine cables, and the mica plates may be .01 inch (10 mils, thick or less.

The holes $h$ in the mica through which the clamping bolts $c$ pass are made to fit the bolts closely, but the corresponding holes $h'$ in the brass are made rather larger, so that the brass plates do not come in contact with the bolts $c$ and good insulation is maintained between them.

The narrow spaces above the mica $m$ and between the brass plates $b$ are filled with selenium in the usual manner and the melted selenium is worked into the spaces between the brass plates by means of a hot glass rod until it completely fills them, and no bubbles are left.

In order to assist the selenium to adhere firmly to the brass plates the surfaces of the latter are very slightly roughened by sand blasting, rubbing with coarse emery cloth, or other suitable means. This also cleans the brass so as to insure good electrical connection between it and the selenium.

The whole surface thus formed of selenium and brass is next carefully filed or scraped or otherwise cut away till only a very thin film of selenium is left, and the selenium is then annealed by heating in the manner described in the specification of prior British Patent No. 3885 of 1880. The selenium film may then be again reduced in thickness and again annealed, and so on, until the highest possible degree of sensitiveness and the minimum of inertia are attained.

The thinner the mica plates are the lower the resistance of the selenium between each pair of brass plates (and therefore the lower the resistance of the whole cell) and also the easier it is to retain the thin film of selenium in place and to prevent them from cracking away during the process of scraping down and annealing.

In some cases successive annealings without scraping before each annealing may be of advantage, for instance when the selenium film is so thin that it cannot safely be further reduced. But when the selenium film has been reduced by scraping or otherwise, annealing is necessary in order to obtain the maximum sensitiveness and minimum of inertia.

In some cases the thickness of the selenium film may be reduced to .001 inch (1 mil) or less, and one object in the mechanical construction of this "cell" is to make the edges of all the strips of mica exactly level with each other so that the films of selenium which cover them may be of equal thickness.

The dimensions given show that by describing the selenium as in the form of a film, the term film is intended to represent an attenuated layer, which under some circumstances may be as thin as .001 of an inch or even less, but, of course, it is to be understood that the term may include a thickness somewhat greater than the particular thickness named, so long as the advantages which result from the high attenuation of the layer of selenium are not lost.

Another object in the construction described is to provide a means for quickly carrying away the heat generated by a current when overcoming the resistance of the selenium. In the well known form of cell in which two parallel wires are wound on an insulating plate and the space between them filled with selenium the heat generated by currents of any considerable strength quickly causes the said wires to be overheated, making them liable to expand and "buckle" so as to come in contact with each other and short circuit the "cell" unless the parallel wires are a considerable distance apart which would have the effect of making the resistance of the cell very high. The expansion of the wires in the direction of their length is also liable to loosen the contact between them and the selenium, thus making the "cell" unreliable.

In the present cell the brass plates $b$ cannot buckle, they are of sufficient mass to take up the heat generated in the selenium, and the clamping bolts $c$ and base plate $e$ to which the cell may be conveniently secured by means of screws $f$ and slot $g$ provide ample means for taking up from the brass plates $a$ and radiating any heat likely to be developed in the selenium.

The base plate $e$ is not essential to the cell except as a useful means of securing the rigidity of construction which is necessary on account of the accurate work involved in properly placing the mica strips with their edges all at the same level. A sheet of mica $m$ or other suitable material is placed between the cell and the base plate $e$ to insulate the cell from the said base plate. When the cell is finished it is coated with shellac varnish in order to protect it from the air, dust, damp or the like.

As shown in Fig. 3 the brass strips $b$ are conveniently arranged in groups separated by thicker pieces of mica. This arrangement is often of great advantage, as for instance when the cell is used as described in my application Serial No. 16,516, for submarine telegraphy filed March 23, 1915, when it is desired to bring the whole of the selenium surface under the influence of the changes of illumination caused by very small movements of a beam of light.

It is not always necessary to separate the groups of plates from each other by thicker pieces of mica as shown in Fig. 3, as the cell may be built up with all the brass plates arranged as for one large group, and the plates may afterward be arranged in groups by connecting up their lugs in any manner desired, and if necessary the selenium can be removed from between the groups so formed.

Figs. 3 and 4 also illustrate a convenient method of arranging the terminals of the cell in which the alternate lugs $1^a$, $3^a$, $5^a$, etc., of the groups of plates 1, 3, 5, etc. are soldered into slots in a plurality of small brass rods $i$. Two brass bars $j$—$j'$ having holes in them to take the rods $i$ and $i'$ are then slipped over these and clamped to them by suitable set screws $k$. The lugs $2^a$, $4^a$, $6^a$, etc. are connected to the bar $j$ and the others to the bar $j'$. In a similar manner some of the lugs $1^b$, $3^b$, $5^b$, etc. of the alternate pairs of plates of each of the groups 1, 3, 5, etc. may be secured to a third bar and the lugs $2^b$, $4^b$, $6^b$, etc. may be secured to a fourth bar. But where the sections of the cell are used as described in the above mentioned specification to form two adjacent arms of a Wheatstone bridge it is merely necessary to join together all the lugs $1^b$, $2^b$, $3^b$, $4^b$, etc. This junction is then the junction of the two selenium arms of the bridge and the two before referred to bars $j$—$j'$ are the outer ends of these two arms. Again of course the sections 1, 2, 3, etc., of the "cells" may be left separate, each with its own pair of terminals and they may be arranged in any way that may be required for any particular purpose.

It will be evident that in order to obtain the maximum effect from a change of illumination over a given area as much as possible of this area should be composed of selenium. This object is attained by the use of very thin brass plates so that the total area presented by their edges is small compared with the area of the selenium between the plates.

It is evident that the method of preparation of a selenium cell as described above may be applied equally to cells of cylindrical and other forms.

What I claim as new and desire to secure by Letters Patent of the United States is:—

1. A selenium cell comprising a plurality of alternately arranged plates of conducting material and plates of insulating material, with the plates of conducting material thinner than and at the edges projecting beyond the plates of insulating material, and films of selenium covering the edges of the insulating plates between and connecting with the projecting edges of the conducting plates, whereby the area of the exposed surface of the selenium is greater than the combined exposed area of the edges of the conducting plates.

2. A selenium "cell" comprising a plurality of alternately arranged plates of conducting and insulating material, alternately arranged lugs on the conducting plates connected up in groups, a plurality of corresponding perforations in each of said plates, the perforations in the conducting material being larger than those in the insulating material and the insulating plates being of smaller size than the said conducting plates, a pair of rigid terminal blocks outside said plates, bolts passing through said plates and terminal blocks and serving to clamp the whole together, and a film of selenium disposed between the projecting edges of the conducting plates substantially as described.

3. A selenium cell comprising metallic plates approximating .003 of an inch in thickness separated by insulating plates approximating .01 of an inch in thickness with the metallic plates having edge portions projecting beyond the like edges of the insulating plates, and films of selenium on the said edges of the insulating plates in contact with the conducting plates and approximating .001 of an inch in thickness.

In testimony whereof I have hereunto signed this specification in the presence of two subscribing witnesses.

K. C. COX.

Witnesses:
R. E. NOBLE,
R. S. BASENDALE.